May 7, 1946. P. S. MARTIN 2,399,814
SOLID FUEL HEATING STOVE
Filed Jan. 4, 1943 4 Sheets-Sheet 3
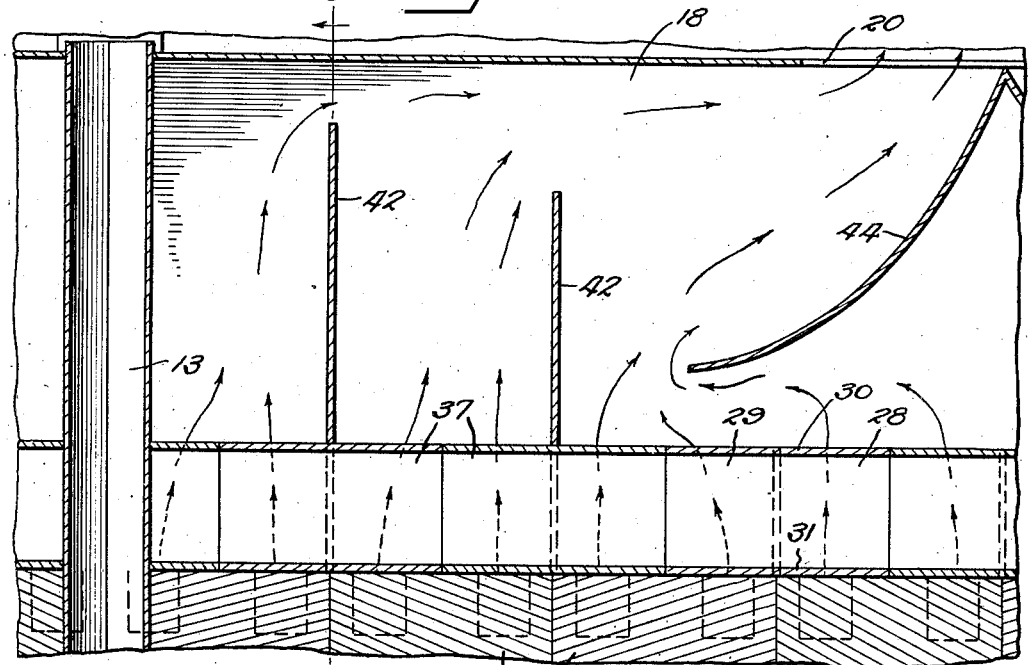
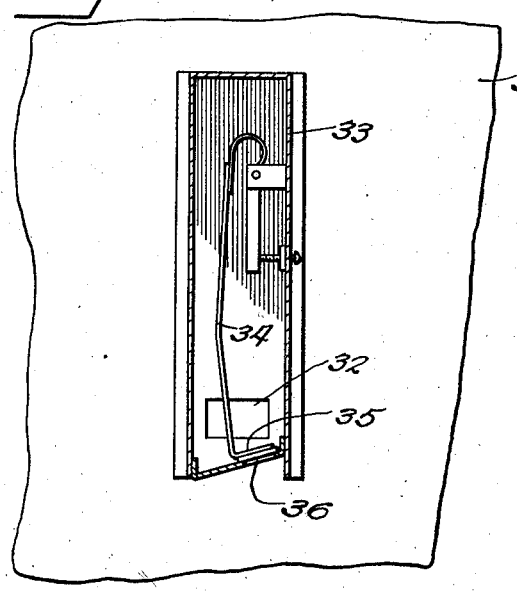
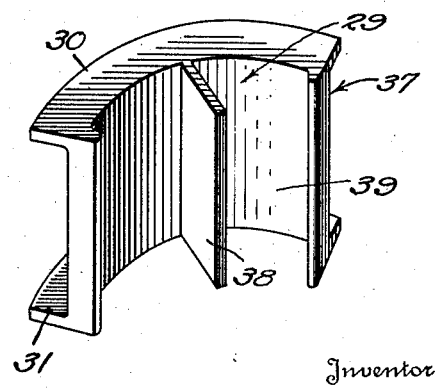
Inventor
P. S. Martin
By Mason Fenwick & Lawrence
Attorneys

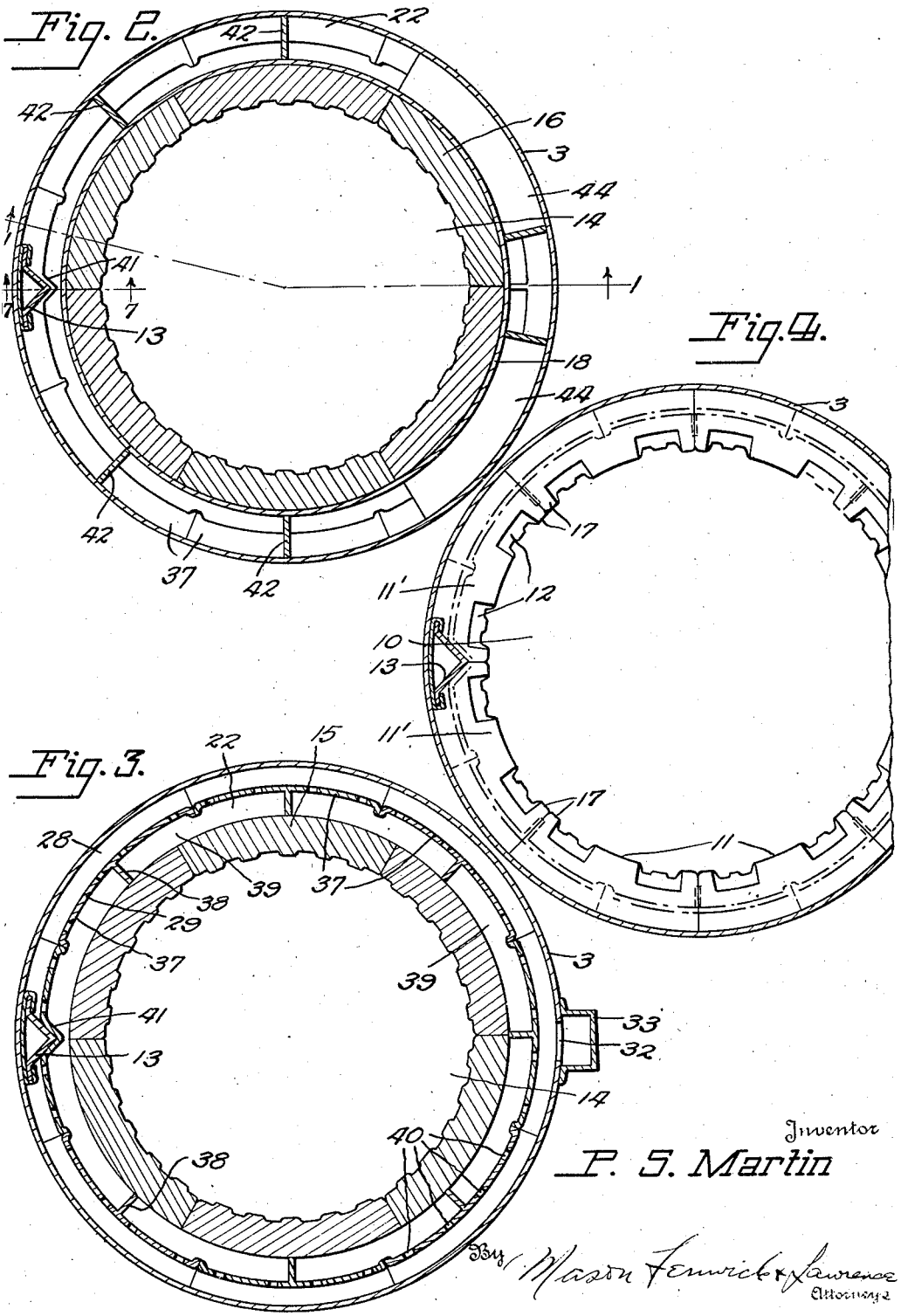

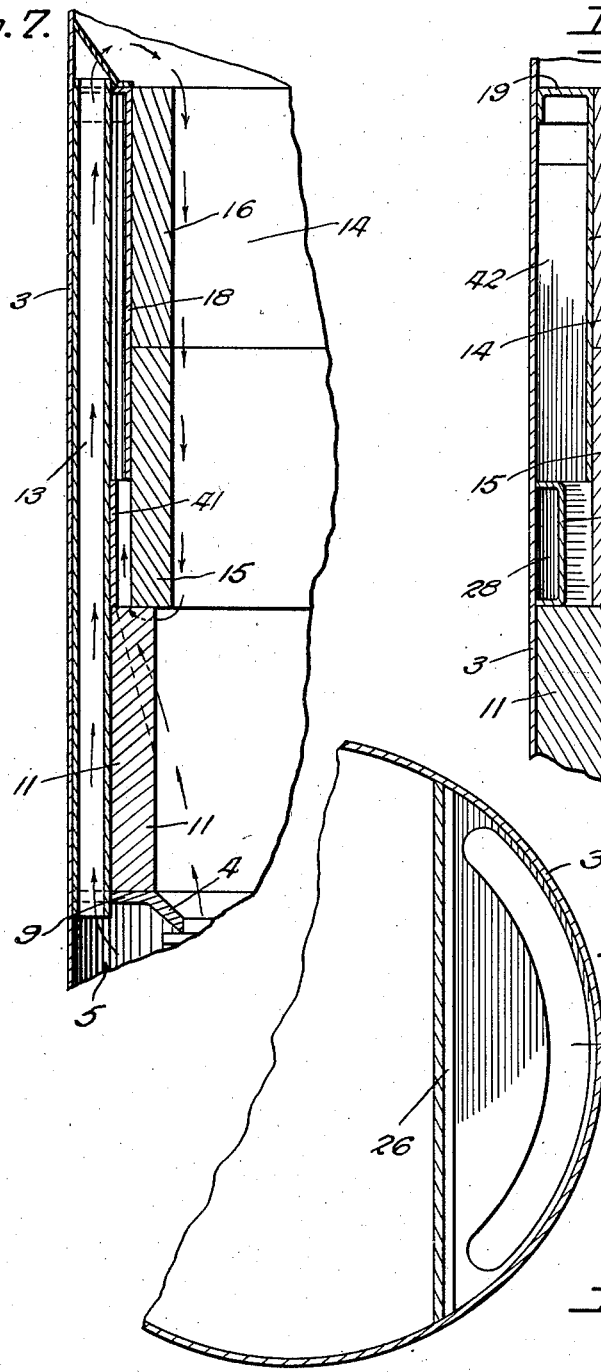
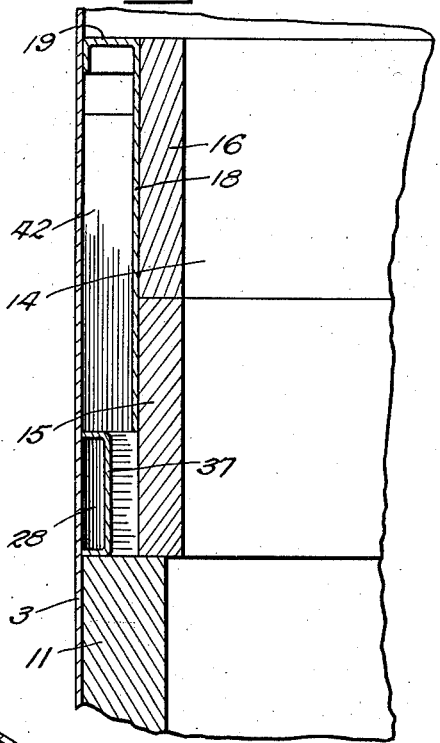
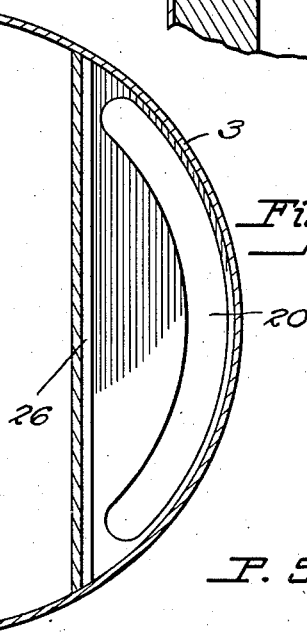

Patented May 7, 1946

2,399,814

UNITED STATES PATENT OFFICE 2,399,814

SOLID FUEL HEATING STOVE

Perry S. Martin, Harrisonburg, Va.

Application January 4, 1943, Serial No. 471,275

13 Claims. (Cl. 126—73)

This invention relates to a solid fuel heating stove particularly adapted to the use of anthracite or bituminous coal.

One of the objects of the invention is to provide a heating stove in which the magazine, located above a fuel combustion chamber, functions as a distillation chamber for preparing the fuel prior to its descent into the fuel combustion chamber, the magazine being surrounded by a gas combustion chamber into the lower part of which the flaming products from the fuel combustion chamber and the distillation gases from the coking chamber are commonly discharged, air being supplied to the lower part of the gas combustion chamber for completing combustion of the distillation gases, controlled by means responsive to stove temperature whereby the supply of air is proportionate to stove demands.

Another object of the invention is to provide a stove of the type described, in which the side wall of the combustion chamber and distillation chamber are of fire brick construction throughout.

Still another object of the invention is to provide a heating stove in which the fire brick side wall of the fuel combustion chamber is closely bounded by the casing of the stove, and the fire brick side wall of the distillation chamber is closely bounded by a circumferential shell, the lateral interfaces between the fire brick being radial whereby the fire bricks are self-keyed in the walls of which they form a part.

A further object of the invention is to provide a heating stove in which the air is supplied to the gas combustion chamber by way of a sectional construction within the casing immediately above the side wall of the fuel combustion chamber, providing a circumferential conduit adjacent the casing, and circumferentially arranged compartments adjacent the distillation chamber forming the lower part of the gas combustion chamber, air being admitted to the conduit by way of a damper-controlled inlet responsive to stove temperature, the conduit communicating with each of the compartments by means of air ports, and the flaming combustion products from the fuel combustion chamber and the distillation gases from the distillation chamber being admitted together to the several compartments through louvers formed in the upper end of the fire brick side wall of the fuel combustion chamber communicating with said compartments.

Another object of the invention is to provide the gas combustion chamber with a plurality of longitudinal baffles or partitions so constructed and arranged as to secure uniform distribution of the hot gases in the gas combustion chamber against the inner side of the stove casing to promote uniform heat exchange through said casing, and against the outer side of the distillation chamber for preheating the fuel mass therein, prior to their discharge through the chimney connection.

A further object of the invention is to provide a draft tube for by-passing a limited air flow from the draft chamber below the grate past the gas combustion chamber to the top of the distillation chamber fixed on the inner side of the stove casing at the front and forming a key or rib which determines a definite orientation of the fire brick in the walls of the fuel combustion chamber as well as the sections of the air conduit which supplies air to the gas combustion chambers, said key and the interfitting parts appurtenant thereto creating baffles for the gas combustion chamber and the air conduit, determining a symmetrical flow through said gas combustion chamber and said air conduit in opposite directions from said baffles, the air inlet to said conduit and the chimney connection for said gas combustion chamber being at the back of the stove.

Still another object of the invention is the provision of a longitudinally channeled side wall for the distillation chamber, the channels providing limited draft passages for burning the peripheral layer of the coke in the distillation chamber, offsetting the tendency of the coke to bridge the distillation chamber through inherent swelling of the coke, when bituminous coal is employed, and permitting free gravitational descent of the coke into the fuel combustion chamber.

Other objects of the invention will appear as the following description of a preferred and practical embodiment thereof proceeds:

In the drawings which accompany and form a part of the following specification, and throughout the several figures of which the same characters of reference have been employed to designate identical parts:

Figure 2 is a cross-section taken along the line 2—2 of Figure 1;

Figure 3 is a cross-section taken along the line 3—3 of Figure 1;

Figure 4 is a cross-section taken along the line 4—4 of Figure 1;

Figure 5 is a development of a portion of the inside of the stove casing in the zone of the gas combustion chamber showing the positions of the distributing baffles from the front of the stove to the chimney connection;

Figure 6 is a front elevation of the thermostatic damper control which admits secondary air to the gas combustion chamber;

Figure 7 is a vertical sectional view through the key member;

Figure 8 is a vertical sectional view taken along the line 8—8 of Figure 5;

Figure 9 is a horizontal section taken along the line 9—9 of Figure 1;

Figure 10 is a perspective view of one of the sections of the secondary air conduit.

Figure 1:
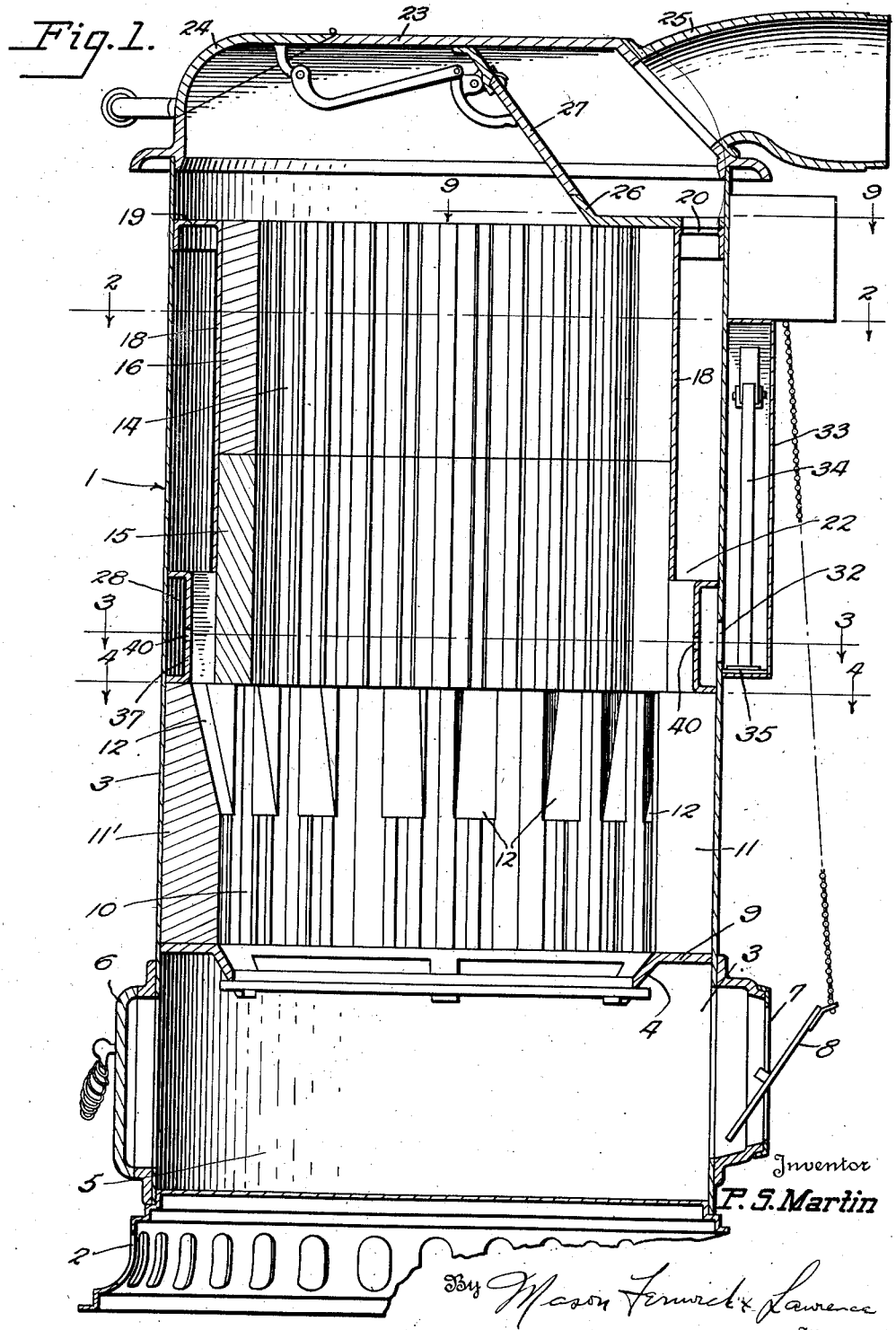
Figure 1 is a vertical section through a heating stove, embodying the principles of the invention, a portion of the base being broken away.

Referring now in detail to the several figures, the numeral 1 represents the stove as a whole, which as shown, has the base 2 supporting the upright casing 3. The illustrated stove is cylindrical, but the invention may be embodied in a stove of oval cross-section or other desired shapes. At a distance above the bottom of the casing 3, the grate 4 is suitably supported, the space within the casing between the base 2 and grate 4 constituting the ash pit 5 having a clean-out door 6 at the front of the stove, and a draft opening 7 at the back, controlled by a damper 8 which may be thermostatically operated, if desired.

The grate is formed with a horizontal peripheral flange 9 serving as a support for the side wall of the fuel combustion chamber 10.

Said side wall is composed of a circumferential series of fire bricks 11. The front and back of the fire bricks, as shown, are of circular curvature, the backs resting against the casing 3. The front walls are ribbed in a longitudinal direction with respect to the height of the stove. The ends of the fire bricks lie in planes which are radial with respect to the axis of the stove. Each of the fire bricks 11 is formed in its upper portion with symmetrically spaced upwardly and outwardly convergent louvers 12.

The casing 3 is provided on its inner side at the front of the stove with a longitudinally extending draft tube 13, the draft function of which will presently be explained. This tube is fixed to the casing and in the illustrated embodiment is of V-shaped cross-section with the apex directed toward the axis of the stove, functioning as a rib or key. The two fire bricks 11' which lie adjacent this rib are chamfered along their adjacent end faces so as to fit against the rib 13. In this manner a definite and symmetrical orientation of the fire bricks in the side wall of the combustion chamber is obtained, and the fact that the said fire bricks abut against the casing 3 and have radial lateral interfaces, causes them to become self-keyed in the stove so that they cannot fall out into the combustion chamber, and require no further means of securement. In building up the side wall of the combustion chamber, the bricks are placed side by side upon the peripheral flange 9 of the grate and the last brick is slipped downwardly into place from the top of the series.

Above the fuel combustion chamber 10 is the distillation chamber 14 which functions also as a fuel magazine and coking chamber when bituminous coal is employed. The side wall of the distillation chamber is formed of one or more circumferential series of fire bricks 15 and 16, two such series being shown in superposed relation. The diameter of the distillation chamber is preferably smaller than that of the fuel combustion chamber, so that the fire bricks 15 rest upon a narrow marginal area of the top of the side wall of the fuel combustion chamber, the end ribs 17 projecting inwardly further than the intermediate ribs, in order to afford such support.

The outer periphery of the distillation chamber 14 is spaced from the casing 3, forming a gas combustion chamber 22 surrounding said distillation chamber. In order that the fire bricks of the distillation chamber shall maintain themselves self-keyed in the same manner as the fire bricks of the fuel combustion chamber, a shell 18 is provided which fits about the several series of fire bricks constituting the distillation chamber. The upper end of this shell has an outwardly extending flange 19 which contacts the casing 3, forming a top for the gas combustion chamber. The shell 18 does not necessarily extend downwardly throughout the full length of the lower series of fire bricks 15, and preferably does not do so. The flange 19 has an arcuate opening 20 at the back, which places the gas combustion chamber in communication with a chimney connection, as will later be described.

The stove is provided with a domed cover 23 which fits the casing 3, forming a chamber above and communicating with the upper end of the distillation chamber, and provided with a hinged solid-fuel door 24, giving access to the upper open end of the distillation chamber for replenishing the fuel in said chamber. The cover is provided at the back with a chimney connection 25. A partition 26 normally excludes the draft of the chimney connection from the distillation chamber. Said partition is provided with a normally closed damper 27 which opens automatically when the fuel door 24 is opened, so as to provide a direct draft through the fuel door open into the chimney connection to prevent gases escaping by way of the open fuel door. The outlet opening 20 from the gas combustion chamber is always in communication with the chimney connection. The adjacent upper end of the fuel combustion chamber and lower end of the distillation chamber are open and contiguous.

A secondary air conduit, which as a whole is designated by the reference character 28, is provided within the casing 3 in a zone immediately above the fuel combustion chamber. Said conduit is of sectional construction, each section 37 comprising an intermediate upright vertical web 29 having upper and lower outwardly extending horizontal flanges 30 and 31, the adjacent ends of the said flanges of adjacent sections being contiguous, so that a continuous conduit is thereby formed outside of said webs 29. This conduit is provided with an air inlet 32 through the casing 3 at the back of the stove. Said air inlet is in communication with the interior of a thermostat housing 33 secured against the casing 3 and containing the adjustable thermostatic element 34, which as shown, is a bimetallic strip, attached to a damper 35, which damper moves to occlude, more or less, an air inlet 36 to the thermostat housing. The housing 33 excludes the thermostatic element from room temperature so that it responds to stove temperature through heat exchange by way of the portion of the casing 3 which is enclosed by the housing 33.

The ends of the flanges 30 and 31 and the web 29 of each section 37 terminate in planes radial with respect to the axis of the stove and all the sections, save one, are provided with a vertical partition 38 extending inwardly from an intermediate part of the web 29, into contact with the outer surface of the fire brick wall of the distillation chamber. Compartments 39 are thus formed, each embracing adjacent halves of contiguous sections, said compartments constituting the lower part of the gas combustion chamber. The sections 37 are preferably so circumferentially arranged that two of the louvers 12 of adjacent fire bricks 11 communicate with each compartment.

The webs 29 of each section are provided with air ports 40, on each side of the partition 38, establishing communication between the conduit 28 and each of the compartments 39. One of the sections 37 is provided intermediately with an inwardly projecting salient 41, permitting the said section to be fitted about the rib 13. This determines the orientation of the sections 37, particularly with respect to the fire bricks 11 and the louvers 12. The rib 13 forms a longitudinal baffle in the gas combustion chamber at the front of the stove dividing the flow of gases in said gas combustion chamber and forms a partition in the conduit 28 which produces a symmetrical flow of air through both sides of said conduit from the air inlet 32. The salient 41 also functions as a partition wall between adjacent compartments 39.

In order to secure uniform distribution of the hot gases through said gas combustion chamber, a plurality of longitudinal baffles 42 are provided in the gas combustion chamber, resting upon the flanges 30 and the upper ends of the partitions 38, forming continuations of said partitions. The lower end of the shell 18 terminates at the level of the flanges 30 and the inner ends of the baffles 42 preferably contact the outer surface of said shell. The baffles 42 terminate short of the top of the gas combustion chamber and are progressively shorter as they approach the arcuate opening 20 to the chimney connection, as shown in Figure 5. A downwardly divergent baffle 44 beneath the opening 20 compels the gases which emerge from the louvers which are immediately under the opening 20 to follow a circuitous path before discharging through said opening. By means of these baffles, a substantially uniform distribution of the hot gases through the gas combustion chamber is secured, so that all parts of the casing 3 which bound the gas combustion chamber are at substantially the same hot temperature. Also, the distillation chamber is substantially uniformly heated circumferentially.

The above construction provides a completely smooth metallic surface for the interior of the gas combustion chamber to which fly ash will not adhere but will gravitate to the lower part of the gas combustion chamber and down the steeply sloping walls of the louvers 12. Ordinarily, the fly ash will be gradually consumed by the intensity of complete combustion in the gas combustion chamber.

The fire brick side wall of the distillation chamber is internally corrugated so that longitudinal channels are formed between the side wall of said chamber and the fuel mass, whereby a limited amount of air supplied by the draft tube is drawn down through said channels, burning the peripheral layer of coke in the distillation chamber where bituminous fuel is employed. It is, of course, well known that in the formation of coke the fuel mass swells and would tend to form a bridge across the distillation chamber. The burning of the peripheral layer offsets the swelling, prevents the coke bridging, and permits its free gravitational descent into the fuel combustion chamber.

In operation, the chimney draft induces a flow of air through the damper-controlled primary air inlet 7, through the grate, the louvers 12, and the gas combustion chamber. The gases in that part of the mass of fuel in the distillation chamber which is adjacent the fuel combustion chamber are evolved through heat from the fuel combustion chamber and are entrained in the flaming gases from the combustion chamber, passing out with said flaming gases into the compartments 39. Here secondary air is admitted to the compartments 39 in quantity sufficient to produce complete combustion of the distillation gases. The proper quantity of air is determined by the thermostatically controlled damper 35, which operates responsive to stove temperature. The burning products of combustion and distillation are distributed uniformly through the gas combustion chamber in the manner which has been described. The fact that the distillation chamber is supplied with air solely through the draft tube 13 which is of relatively small cross-section, limits combustion from this air source to the peripheral layer of fuel in the distillation chamber to which said air has access by way of the channels formed by the corrugated inner surface of the side wall of the distillation chamber. The combustion from the fuel combustion chamber also invades the lower part of the fuel in the distillation chamber, the mass of carbonaceous fuel from which the gases have been distilled moving progressively downward into the combustion zone. The transition from raw coal to substantially gas free carbon or coke in the distillation chamber is gradual and continuous as the mass of fuel in the distillation chamber progressively sinks into the fuel combustion chamber. The location of the conduit 28 within the casing 3 and in the zone of initial discharge of the combustion gases from the fuel combustion chamber and the ignition of the distillation gases, causes the secondary air supplied to the gas combustion chamber to be pre-heated, and the location of the draft tube 13 within the casing 3 preheats the air supplied to the distillation chamber. The disposing of the hot combustion gases in the form of an outer envelope immediately surrounding the distillation chamber and within the stove casing assures the optimum utilization of the generated heat, while the complete combustion of the distillation gases in the zone immediately adjacent the exterior of the stove also makes for maximum heat exchanging efficiency.

The rate of combustion in the fuel combustion chamber and of distillation in the distillation chamber is coordinated because they derive air from the same controlled air supply, causing a gradual release of gases proportionate to combustion demands instead of a flash release in excess of the capacity of the heat dispelling surfaces of the stove to discharge.

The provision of a complete fire brick lining for the fuel combustion and distillation chambers not only insulates the burning and distilling mass from sudden extraneous temperature fluctuations, but also prolongs the life of the stove by the avoidance of the burning out of metallic linings, and permits the major mass of the stove to be made of noncritical materials involving the employment of a minimum of metal. All these and other factors contribute to the production of a heating stove which has achieved a rating in the Bureau of Standards tests of 77%, a higher efficiency rating than has been obtained by any other heating stove previously tested.

Although in the above disclosure the use of fire brick is emphasized for the lining of the fuel combustion and distillation chambers as contributing materially to the efficiency of the stove, it is within the purview of the invention to employ any other material than fire brick, if desired, nor is it essential that the walls of said chamber be fashioned from individual units of brick or other material, this being largely a matter of practicability of manufacture and convenience of assemblage.

While I have in the above disclosure described what I believe to be a preferred and practical embodiment of the invention, it will be understood to those skilled in the art that the specific details of construction and the arrangement of parts, as shown, are by way of illustration and not to be construed as limiting the scope of the invention which is defined in the appended claims.

What I claim is:

1. Solid fuel heating stove comprising an upright cylindrical casing, a grate supported above the bottom of said casing having a peripheral flange, a longitudinally extending rib in fixed position on the interior side of said casing, a circumferential series of fire bricks with radial interfaces, within said casing, supported by said flange and contacting the casing constituting the side wall of a fuel combustion chamber, a circumferential series of laterally contiguous fire bricks with radial interfaces, within said casing, forming the side wall of a distillation chamber supported upon the side wall of said fuel combustion chamber, the adjacent ends of said chambers being open and contiguous, the side wall of said distillation chamber being spaced from said incasing forming a gas combustion chamber about said distillation chamber, a shell closely surrounding the fire brick wall of said distillation chamber having an outwardly extended upper flange forming a top for the gas combustion chamber, the fire bricks which constitute the side wall of the fuel combustion chamber having louvers at their upper ends communicating with the lower portion of said gas combustion chamber whereby the flaming products from said fuel combustion chamber and the distillation gases from said distillation chamber have common access to said gas combustion chamber, said casing being provided with a damper-controlled air inlet below said grate, a chimney connection communicating with the upper end of said gas combustion chamber inducing draft through said fuel combustion chamber, a cover for said distillation chamber having a solid-fuel door, excluding said distillation chamber from the direct pull of said chimney draft, and means forming a conduit about the lower part of said gas combustion chamber having an air inlet and provided with secondary air ports communicating with said gas combustion chamber to supply air thereto sufficient for complete combustion of the distillation gases, the fire bricks adjacent both sides of said rib in the side wall of said fuel combustion chamber being shaped to interfit with said rib whereby definite orientation of the bricks constituting the side wall of said fuel combustion chamber, within said casing is determined.

2. Solid fuel heating stove comprising an upright cylindrical casing, a grate supported above the bottom of said casing having a peripheral flange, a circumferential series of fire bricks with radial interfaces, within said casing, supported by said flange and contacting said casing constituting the side wall of a fuel combustion chamber, a circumferential wall of laterally contiguous fire bricks with radial interfaces, within said casing, forming the side wall of a distillation chamber supported by the side wall of said fuel combustion chamber, the adjacent ends of said distillation chamber and fuel combustion chamber being open and contiguous, the side wall of said distillation chamber being spaced from said casing forming a gas combustion chamber about said distillation chamber, a sectional conduit within said casing resting upon the upper end of the side wall of said fuel combustion chamber, each section having an intermediate upright arcuate web having upper and lower flanges extending outwardly from said web into contact with said casing and at their ends contacting the corresponding flanges of adjacent sections making said conduit continuous outide of said web, an air inlet to said conduit through said casing, each section having an intermediate flange extending radially inward from said web contacting the side wall of said distillation chamber, said radially extending flanges partitioning the lower part of said gas combustion chamber into a plurality of compartments communicating with the upper part of said gas combustion chamber, the side wall of said fuel combustion chamber having a series of louvers at its upper end, communicating with said compartments, whereby the flaming products from said fuel combustion chamber and the distillation gases from said distillation chamber have common access to said gas combustion chamber, said casing being provided with a damper-controlled air inlet below said grate, a chimney connection communicating with the upper end of said gas combustion chamber inducing draft through said fuel combustion chamber, a cover for said distillation chamber excluding it from the direct pull of said chimney draft, each compartment having air ports through said web communicating with said conduit for supplying secondary air to said compartment sufficient for complete combustion of the distillation gases.

3. Solid fuel heating stove comprising an upright casing, a grate supported above the bottom of said casing having a peripheral flange, a circumferential series of fire bricks with radial interfaces, within said casing, supported by said flange and contacting said casing constituting the side wall of a fuel combustion chamber, a circumferential wall of laterally contiguous fire bricks with radial interfaces, within said casing, forming the side wall of a distillation chamber supported by the side wall of said fuel combustion chamber, the adjacent ends of said distillation chamber and fuel combustion chamber being open and contiguous, the side wall of said distillation chamber being spaced from said casing forming a gas combustion chamber about said distillation chamber, a sectional conduit within said casing resting upon the upper end of the side wall of said combustion chamber, each section having an intermediate upright arcuate web having upper and lower flanges extending outwardly from said web into contact with said casing and at their ends contacting the corresponding flanges of adjacent sections making said conduit continuous outside of said web, an air inlet to said conduit through said casing, each section having an intermediate flange extending inwardly from said web contacting the side wall of said distillation chamber, said radially extending flanges partitioning the lower part of said gas combustion chamber into a plurality of compartments communicating with the upper part of said gas combustion chamber, baffles within said gas combustion chamber above said sections and alined with said inwardly extending flanges, terminating short of the top of said gas combustion chamber, the side wall of said fuel combustion chamber being provided with a series of louvers at its upper end communicating with said compartments on both sides of said alined flanges and baffles, whereby the flaming products from said fuel combustion chamber and the distillation gases from said distillation chamber have common access to said gas combustion chamber between said flanges and baffles, said casing being provided with a damper-controlled air inlet below said grate, a chimney connection communicating with the upper end of said gas combustion chamber inducing draft through said fuel combustion chamber, a cover for said distillation chamber excluding it from the direct pull of said chimney draft, each compartment having air ports through said web communicating with said conduit for supplying secondary air to said compartment sufficient for complete combustion of the distillation gases.

4. Solid fuel heating stove comprising an upright cylindrical casing, a grate supported above the bottom of said casing having a peripheral flange, a circumferential series of fire bricks with radial interfaces, within said casing, supported by said flange and contacting said casing constituting the side wall of a fuel combustion chamber, a circumferential series of laterally contiguous fire bricks with radial interfaces, within said casing, forming the side wall of a distillation chamber, supported upon the side wall of said fuel combustion chamber, the adjacent ends of said distillation chamber and fuel combustion chamber being open and contiguous, the side wall of said distillation chamber being spaced from said casing, forming a gas combustion chamber about said distillation chamber, the fire bricks which constitute the side wall of the fuel combustion chamber having louvers at their upper ends communicating with the lower portion of said gas combustion chamber whereby the flaming products from said fuel combustion chamber and the distillation gases from said distillation chamber have common access to said gas combustion chamber, said casing below said grate constituting an air chamber communicating with said fuel combustion chamber through said grate and having a controlled air inlet, a shell surrounding the side wall of said distillation chamber having an outwardly extending peripheral flange constituting the top of said gas combustion chamber, a chimney connection communicating with the upper end of said gas combustion chamber inducing draft through said fuel combustion chamber, a cover for said distillation chamber excluding it from the direct pull of said chimney draft, means forming a conduit about the lower part of said gas combustion chamber having an air inlet and provided with air ports communicating with said gas combustion chamber to supply air thereto sufficient for complete combustion of the distillation gases, a tubular rib extending longitudinally through said grate flange, said gas combustion chamber and the top of said gas combustion chamber placing the upper end of said distillation chamber in communication with said air chamber, the fire bricks adjacent both sides of said rib in the side wall of said fuel combustion chamber being shaped to interfit with said rib whereby definite orientation of the bricks constituting the side wall of the fuel combustion chamber within said casing is determined.

5. Solid fuel heating stove comprising an upright cylindrical casing, a grate supported above the bottom of said casing having a peripheral flange, a circumferential series of fire bricks with radial interfaces, within said casing, supported by said flange and contacting said casing constituting the side wall of a fuel combustion chamber, a circumferential series of laterally contiguous fire bricks with radial interfaces, within said casing, forming the side wall of a distillation chamber, supported upon the side wall of said fuel combustion chamber, the adjacent ends of said distillation chamber and fuel combustion chamber being open and contiguous, the side wall of said distillation chamber being spaced from said casing, forming a gas combustion chamber about said distillation chamber, the fire bricks which constitute the side wall of the fuel combustion chamber having louvers at their upper ends communicating with the lower portion of said gas combustion chamber whereby the flaming products from said fuel combustion chamber and the distillation gases from said distillation chamber have common access to said gas combustion chamber, said casing below said grate constituting an air chamber communicating with said fuel combustion chamber through said grate and having a controlled air inlet, a shell surrounding the side wall of said distillation chamber having an outwardly extending peripheral flange constituting the top of said gas combustion chamber, a chimney connection communicating with the upper end of said gas combustion chamber inducing draft through said fuel combustion chamber, a cover for said distillation chamber excluding it from the direct pull of said chimney draft, means forming a conduit within the lower part of said gas combustion chamber having an air inlet and provided with air ports communicating with said gas combustion chamber to supply air thereto sufficient for complete combustion of the distillation gases, a tubular rib extending longitudinally through said grate flange, said gas combustion chamber and the top of said gas combustion chamber placing the upper end of said distillation chamber in communication with said air chamber, said conduit, and the fire bricks adjacent both sides of said rib in the side wall of said fuel combustion chamber being shaped to interfit with said rib whereby definite orientation of the bricks constituting the side wall of said fuel combustion chamber is determined relative to said conduit.

6. In a stove for burning solid fuel, means forming an up-draft solid fuel combustion chamber, a superposed down-draft distillation chamber, the latter being a fuel magazine, and a gas combustion chamber surrounding said distillation chamber, the adjacent ends of said solid fuel combustion chamber and distillation chamber being open and contiguous, said stove being provided with a plurality of circumferentially distributed ports adjacent the plane of contiguity of the adjacent ends of said solid fuel combustion and distillation chambers, in communication therewith and with the lower part of said gas combustion chamber, and commonly discharging the gaseous products from said solid fuel combustion and distillation chambers into said gas combustion chamber, a common primary air inlet, air intakes opening respectively into the top of said distillation chamber and the bottom of said solid fuel combustion chamber communicating with said primary air inlet proportionately sized to supply a major portion of air to the bottom of said solid fuel combustion chamber and a minor portion of air to the top of said distillation chamber, a secondary air manifold within the lower part of said gas combustion chamber extending circumferentially thereabout and spaced from the wall of said distillation chamber forming a passage within said gas combustion chamber above said ports, a secondary air inlet communicating with said manifold, the latter having circumferentially distributed openings communicating with said passage, and a chimney flue connection to the upper part of said gas combustion chamber.

7. A stove for burning solid fuel, as claimed in claim 6, including a thermostatically controlled damper for said secondary air inlet, having a thermostatic element shielded from room atmosphere and responsive to stove temperature.

8. In a stove for burning solid fuel, walls defining an up-draft solid fuel combustion chamber, a superposed down-draft distillation chamber, the latter being a fuel magazine, and a gas combustion chamber surrounding said distillation chamber, the adjacent ends of said solid fuel combustion chamber and distillation chamber being open and contiguous, the wall of said distillation chamber inwardly overhanging the wall of said solid fuel combustion chamber at an angle less than the angle of repose of the solid fuel whereby the upper peripheral zone of said solid fuel combustion chamber is maintained free of fuel, the wall of the latter chamber in said zone being formed with a plurality of circumferentially distributed restricted ports communicating with the lower part of said gas combustion chamber, forming avenues of discharge for the gaseous products from said distillation chamber and solid fuel combustion chamber, a common air inlet, air intakes opening respectively in the top of said distillation chamber and the bottom of said fuel combustion chamber and in communication with said air inlet, proportionately sized to supply a major portion of air to the bottom of said solid fuel combustion chamber and a minor portion of air to the top of said distillation chamber, and a chimney flue connection to the upper part of said gas combustion chamber.

9. In a stove for burning solid fuel, walls defining an up-draft solid fuel combustion chamber, a superposed down-draft distillation chamber, the latter being a fuel magazine, and a gas combustion chamber surrounding said distillation chamber, the adjacent ends of said solid fuel combustion chamber and distillation chamber being open and contiguous, the wall of said distillation chamber inwardly overhanging the wall of said solid fuel combustion chamber at an angle less than the angle of repose of the fuel, whereby the upper peripheral zone of said solid fuel combustion chamber is maintained free of fuel, a common primary air inlet, air intakes opening respectively into the bottom of said solid fuel combustion chamber and the top of said distillation chamber and in communication with said primary air inlet, proportionately sized to supply a major portion of air to the bottom of said solid fuel combustion chamber and a minor portion of air to the top of said distillation chamber, a secondary air manifold within the lower part of said gas combustion chamber extending circumferentially thereabout and spaced from the wall of said distillation chamber forming a circumferential passage within said gas combustion chamber, a secondary air inlet communicating with said manifold, the latter having circumferentially distributed openings communicating with said solid fuel combustion chamber in said fuel free zone, the wall of said solid fuel combustion chamber being of fire brick having a plurality of circumferentially distributed restricted upwardly and outwardly divergent ports communicating with said respective passages, and a chimney flue connection to the upper part of said gas combustion chamber.

10. In a stove for burning solid fuel, an upright casing, a grate supported above the base of said casing having a peripheral flange, a circumferential wall of fire brick sections resting on said flange having radial contiguous faces, said grate and wall constituting a solid fuel combustion chamber, means positioned above said wall constituting a distillation chamber, the adjacent ends of said solid fuel combustion chamber and distillation chamber being open and contiguous, an air inlet in said casing below said grate, a conduit opening through said flange to the space beneath said grate communicating with said air inlet and with the top of said distillation chamber, said conduit extending in longitudinally fixed position with respect to said casing and intersecting the outer boundary of said fire brick wall, engaged by adjacent sections of said wall whereby the sections of said wall are definitely arranged, symmetrically on opposite sides of said conduit, the open area of said grate and the cross-sectional area of said conduit being proportionately sized to supply a major portion of air to said solid fuel combustion chamber through said grate, and a minor portion of air to said distillation chamber, and means for subjecting the contiguous ends of said chambers to chimney suction.

11. In a stove for burning solid fuel, walls defining an up-draft solid fuel combustion chamber, a superposed down-draft distillation chamber, the latter being a fuel magazine, and a gas combustion chamber surrounding said distillation chamber, the adjacent ends of said solid fuel combustion chamber and distillation chamber being open and contiguous, the wall of said distillation chamber inwardly overhanging the wall of said solid fuel combustion chamber at an angle less than the angle of repose of the fuel whereby the upper peripheral zone of said solid fuel combustion chamber is maintained free of fuel, a common primary air inlet, air intakes opening respectively into the bottom of said solid fuel combustion chamber and the top of said distillation chamber and in communication with said air inlet, proportionately sized to supply a major portion of air to the bottom of said solid fuel combustion chamber and a minor portion of air to the top of said distillation chamber, a secondary air manifold within the lower part of said gas combustion chamber extending circumferentially thereabout, forming a circumferential preheating chamber for secondary air, having an inner wall spaced from the wall of said distillation chamber defining a passage within said gas combustion, a secondary air inlet to said preheating chamber, said inner wall having circumferentially distributed ports between said preheating chamber and passage, the wall of said solid fuel combustion chamber being of fire brick having a plurality of circumferentially distributed restricted upwardly and outwardly divergent ports communicating with said fuel free zone of said solid fuel combustion chamber and said passage, and a chimney flue connection to the upper part of said gas combustion chamber.

12. In a stove for burning solid fuel, means forming an up-draft solid fuel combustion chamber, a superposed down-draft distillation chamber, the latter being a fuel magazine, and a gas combustion chamber surrounding said distillation chamber, the adjacent ends of said solid fuel combustion chamber and distillation chamber being open and contiguous, said stove being provided with a plurality of circumferentially distributed ports adjacent the plane of contiguity of the adjacent ends of said solid fuel combustion and distillation chambers, in communication therewith and with the lower part of said gas combustion chamber, and commonly discharging the gaseous products from said solid fuel combustion and distillation chambers into said gas combustion chamber, a common primary air inlet, air intakes opening respectively into the bottom of said solid fuel combustion chamber and the top of said distillation chamber and in communication with said air inlet, proportionately sized to supply a major portion of air to the bottom of said solid fuel combustion chamber and a minor portion of air to the top of said distillation chamber, a secondary air manifold within the lower part of said gas combustion chamber extending circumferentially thereabout and spaced from the wall of said distillation chamber forming a passage within said gas combustion chamber above said ports, a secondary air inlet communicating with said manifold, the latter having circumferentially distributed openings communicating with said passage, a chimney flue connection to the upper part of said gas combustion chamber, and means forming spaced baffles longitudinally positioned within the lower part of said gas combustion chamber terminating short of the top of said gas combustion chamber defining between them flues each embracing at least one of said ports for directing the flow of gaseous products therefrom upwardly in segregate columns, the distance from the top of said baffles to the top of said gas combustion chamber, proceeding in both directions from a point opposite said chimney flue connection, progressively increasing.

13. Stove for burning solid fuel as claimed in claim 12, including a baffle obstructing direct flow to said chimney connection from those ports directly beneath said chimney connection.

PERRY S. MARTIN.